(No Model.)

M. D. COLBATH.
DISH CLEANER.

No. 505,191. Patented Sept. 19, 1893.

Witnesses
C. A. Ford.
O. E. Doyle.

Inventor
M. D. Colbath,
By his Attorneys,
C. A. Snow & Co.

UNITED STATES PATENT OFFICE.

MONROE D. COLBATH, OF MARS HILL, MAINE.

DISH-CLEANER.

SPECIFICATION forming part of Letters Patent No. 505,191, dated September 19, 1893.

Application filed May 31, 1893. Serial No. 476,117. (No model.)

*To all whom it may concern:*

Be it known that I, MONROE D. COLBATH, a citizen of the United States, residing at Mars Hill, in the county of Aroostook and State of Maine, have invented a new and useful Dish-Washer, of which the following is a specification.

My invention relates to improvements in dish-washing apparatus, the objects in view being to provide a simple, inexpensive and efficient device adapted to be arranged in a suitable pan or container and carrying, in addition to the necessary parts for elevating and spraying the water, a rack to support the dishes.

Further objects and advantages of my invention will appear in the following description and the novel features thereof will be particularly pointed out in the claims.

Figure 1:
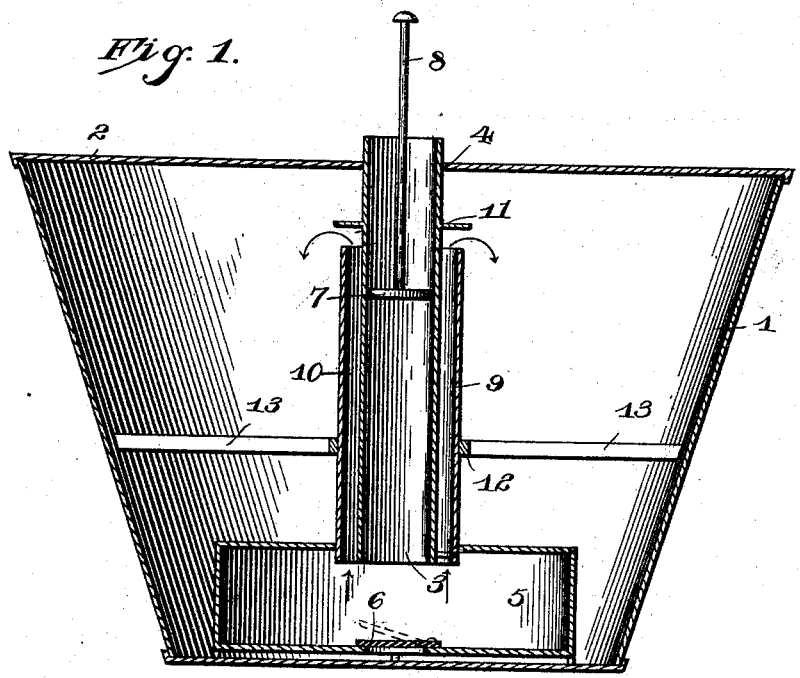
Figure 2:
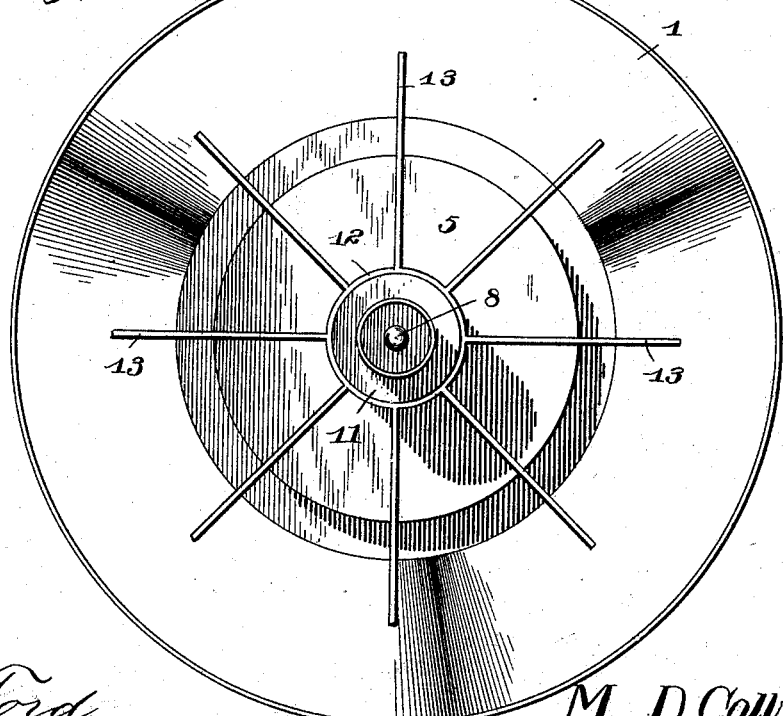

In the drawings—Figure 1 is a central vertical sectional view of a device embodying my invention. Fig. 2 is a plan view with the pan cover removed.

Similar numerals of reference indicate corresponding parts in both the figures of the drawings.

1 represents a suitable pan or container provided with a removable cover 2, and arranged concentrically in the pan is a pump cylinder 3 which projects at its upper end through a central opening 4 in the pan cover and communicates at its lower end with a receiver 5 which is preferably circular in plan. This receiver forms a base for the dish-washing apparatus and rests upon the bottom of the pan and is provided with a suitable inlet valve 6 which permits the inflow and prevents outflow of the water. In the cylinder 3 operates a plunger 7 having a suitable stem 8 which projects above the upper end of the cylinder and is provided with a suitable handle for operation.

Surrounding the cylinder 3, which I will for convenience term the inner cylinder, is a cylindrical shell 9, the walls of which are separated from the inner cylinder to form an annular outer cylinder 10, open at its upper end and communicating at its lower end with the receiver 5. Secured to the upper portion of the inner cylinder and projecting laterally over the upper end of the outer cylinder is a deflecting shield 11.

12 represents the dish-rack comprising spaced radially-disposed bars 13 which are fixed at their inner ends to the wall of the outer cylinder and terminate at their extremities contiguous to the outer sides of the pan, thereby, in conjunction with the opening 4 in the pan cover which receives the upper end of the inner cylinder, forming a lateral support for the apparatus to prevent vibration during operation.

The dishes are placed upon the dish-rack which, as will be observed, is arranged near the bottom of the pan or container and slightly above the upper side of the cylindrical receiver or base 5. The piston or plunger is elevated to the position shown in Fig. 1 in order to draw the water into the inner cylinder, and is then depressed forcibly, thereby closing the valve 6 and causing the water to ascend through the outer annular cylinder 10. The water, upon leaving the upper end of the outer cylinder, is projected against the deflecting shield 11 and is thereby spread and discharged upon the dishes.

The arrangement of the apparatus in the center of the pan enables the dishes to be arranged around the same, and as the concentric cylinders occupy but little space, it will be understood that the pan is capable of containing almost as many dishes as if the washing apparatus were omitted. The upper end of the inner cylinder is open, as shown, to enable the plunger to be removed for the purpose of cleansing the interior of the apparatus, which is essential in a device of this class for the reason that the inner surfaces become coated with grease which may result in rendering the apparatus inoperative.

Having described my invention, what I claim is—

1. The combination with a suitable pan or container, of concentric outer and inner cylinders arranged axially in the pan or container and having open upper and lower ends, a valved receiver communicating with the lower ends of said cylinders, a plunger operatively mounted in the inner cylinder, and a deflecting shield carried by the inner cylinder and projecting laterally over the upper end of the outer cylinder, substantially as specified.

2. The combination with a pan or container, of concentric inner and outer cylinders arranged axially in the pan or container, a valved receiver communicating with the lower ends of the cylinders, a plunger operatively fitted in the inner cylinder, a deflecting shield carried by the inner cylinder and projecting laterally over the upper end of the outer cylinder, and a dish-rack fixed exteriorly to the outer cylinder and having its periphery arranged contiguous and conforming to the walls of the pan or container, substantially as specified.

3. The combination with a pan or container provided with a cover having a central opening, of concentric outer and inner cylinders arranged axially in the pan or container, the inner cylinder projecting above the upper end of the outer cylinder and extending through the central opening in the pan cover, the upper ends of both cylinders being open, a valved receiver communicating with the lower ends of the cylinders and resting upon the bottom of the pan or container, a plunger operatively fitted in the inner cylinder, a deflecting shield fixed exteriorly to the inner cylinder and projecting laterally over the upper end of the outer cylinder, and a dish rack carried by the outer cylinder with its periphery contiguous to the walls of the pan or container, substantially as specified.

In testimony that I claim the foregoing as my own I have hereto affixed my signature in the presence of two witnesses.

MONROE D. COLBATH.

Witnesses:
  GEO. H. SMITH,
  BYRON P. WHEELER.